United States Patent [19]

Orlandi

[11] Patent Number: 5,080,134
[45] Date of Patent: Jan. 14, 1992

[54] WATER FLOW CONTROL UNIT IN MIXING VALVE FOR HOT AND COLD WATER

[75] Inventor: Alessio Orlandi, Castiglione D/Stiviene, Italy

[73] Assignee: Galatron S.r.l., Italy

[21] Appl. No.: 605,945

[22] Filed: Oct. 30, 1990

[51] Int. Cl.⁵ .................................. F16K 11/074
[52] U.S. Cl. .................... 137/625.17; 137/625.4
[58] Field of Search .................. 137/625.17, 625.4

[56] References Cited

U.S. PATENT DOCUMENTS

| | | | |
|---|---|---|---|
| 3,533,444 | 10/1970 | Lyon | 137/625.17 |
| 4,362,186 | 12/1982 | Parkison et al. | 137/625.17 |
| 4,378,029 | 3/1983 | Parkison | 137/625.17 X |
| 4,453,567 | 6/1984 | MacDonald | 137/625.17 X |
| 4,513,781 | 4/1985 | Nikolayczik | 137/625.17 X |
| 4,540,023 | 9/1985 | Pawelzik | 137/625.17 |
| 4,617,965 | 10/1986 | Lorch | 137/625.17 |
| 4,621,659 | 11/1986 | Pawelzik | 137/625.17 |
| 4,657,045 | 4/1987 | Kitamura | 137/625.17 X |

*Primary Examiner*—John Rivell
*Attorney, Agent, or Firm*—McGlew & Tuttle

[57] ABSTRACT

The invention relates to a water flow control unit in mixing valves for hot and cold water comprising two overlapping ceramic disks (11,12) one of which is fixed and the other movable. The fixed disk (11) has two inlet holes (15,16) which are substantially of uniform width and are symmetrically cut, with respect to a water dividing partition (19), into one half of the same disk. The fixed disk (11) also has an elliptic shaped outlet hole where one part is placed between the two inlet holes or openings (15,16) and the other part extends into the other half of the fixed disk. The movable disk (12) has a mixing chamber defined by a circular part (18a) off-center from the middle of the same disk and a communicating polygonal part (18b).

10 Claims, 3 Drawing Sheets

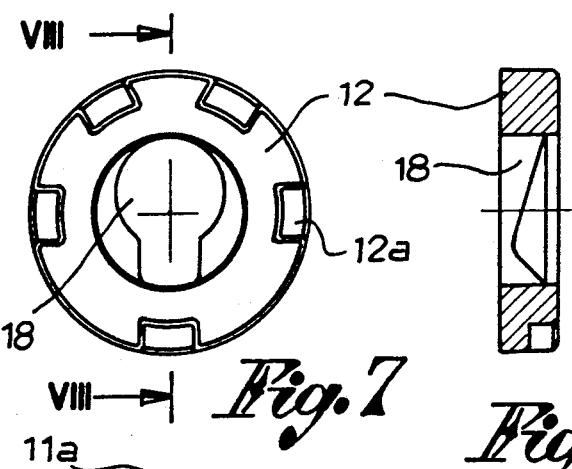
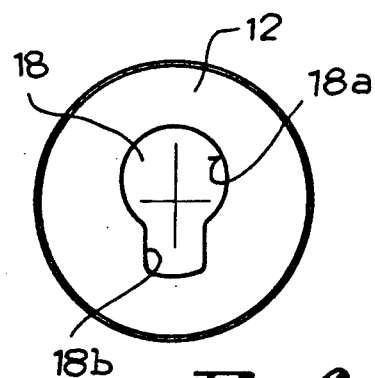
Fig.7  Fig.8  Fig.6
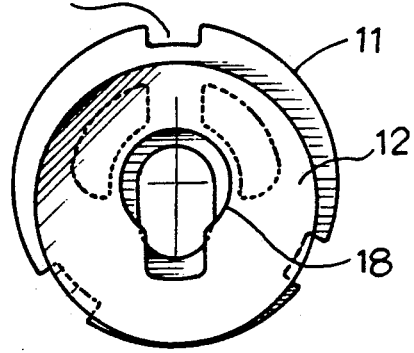
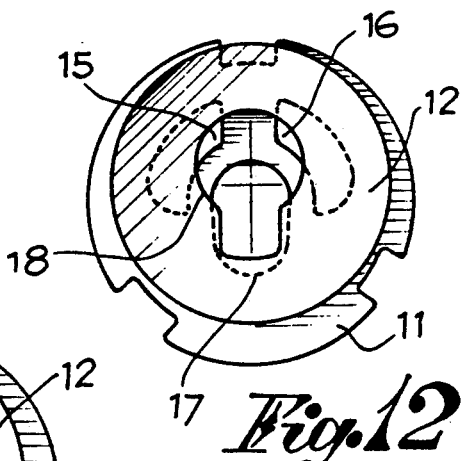
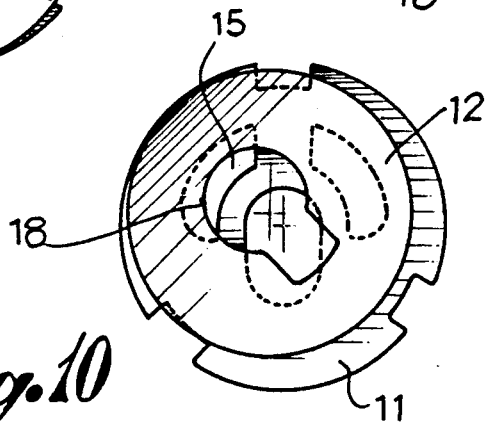
Fig.9  Fig.12  Fig.10
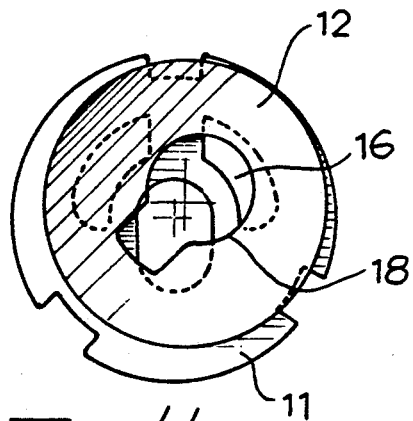
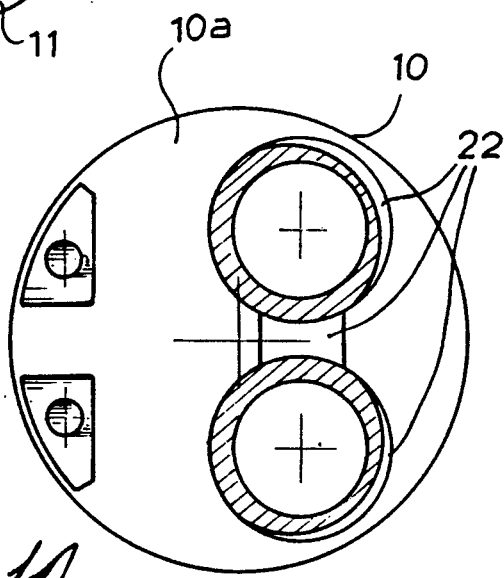
Fig.11  Fig.14

WATER FLOW CONTROL UNIT IN MIXING VALVE FOR HOT AND COLD WATER

FIELD OF THE INVENTION

The present invention relates in general to single-control mixing valves for hot and cold water and in particular to a water flow control unit in said valves, a group which comprises two overlapping ceramic disks, one of which is fixed and the other movable.

BACKGROUND OF THE INVENTION

Cartridge type mixing valves for hot and cold water incorporating a mixing unit made up of two overlapping disks in ceramic or other materials, one of which is fixed and the other movable, operated both radially and in rotation on and in respect to the fixed one, are already known. The fixed disk usually has two water inlet holes which communicate with two separate conduits for hot and cold water and an outlet hole leading to the tap to which the valve is fixed.

The moving disk is in turn operated by a control lever and the moving disk has a mixing chamber designed to selectively join one or both water inlet holes with the outlet one.

It has, however, not yet been possible to reach optimal flow and mixing results with the shapes of the water inlet holes or openings of the overlapping disks so far known, without having to adopt disks with relatively large diameters. This would mean that the volumes of the cartridge valves cannot be limited or contained as wanted.

SUMMARY AND OBJECTS OF THE INVENTION

The present invention aims to solve these problems and to provide mixing valves with a flow control unit, that is to say two disks in ceramic or similar materials which, thanks to particular and original arrangements and shapes of the water inlet holes or openings of said disks, have improved flow and mixing performances. The using of disks which comply with the invention allows advantage to be taken of spaces which make use of the entire available surface and to therefore reach the requested flow even with disks of smaller diameter, which clearly allows for an advantageous reduction in the volumes and dimensions of the valves which incorporate said disks. The invention set forth also allows for the reduction of the movement angle of the upper disk on top of the lower disk, keeping the correct mixing conditions and retaining a satisfactory so called comfort angle due to a reduction of the water dividing cusp between the holes or openings of the fixed disk.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

FIGS. 6 and 7 respectively show the lower and upper surfaces of the movable disk;

FIG. 8 is a section on the lines VIII—VIII in FIG. 7;

FIGS. 9, 10, 11 and 12 are different section views of the movable disk on top of the fixed one for the closing and flow conditions for only hot water, only cold water and mixed water;

FIG. 14 is an underneath view of the valve in FIG. 1; and

DETAILED DESCRIPTION OF THE PREFERRED EMBODIMENT

Figure 1:
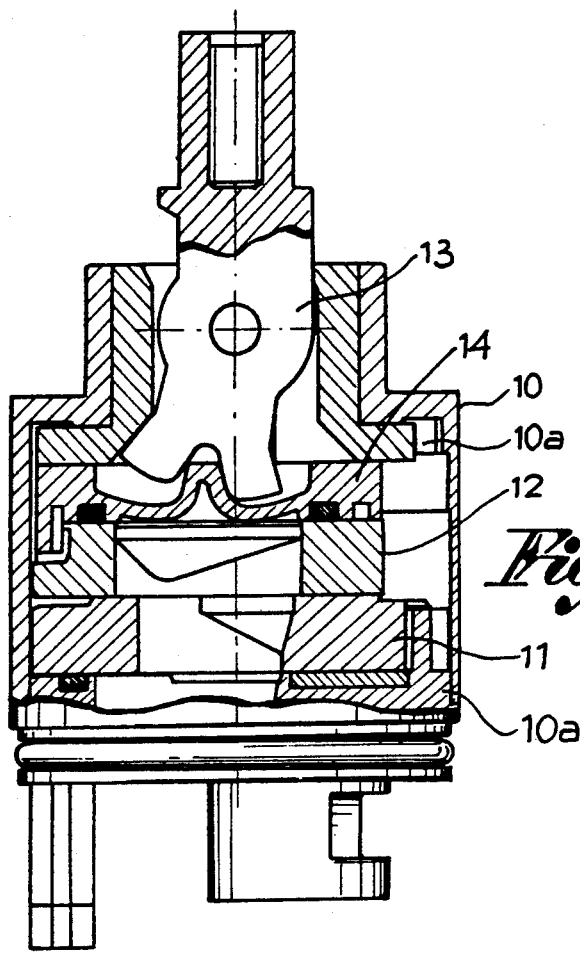
FIG. 1 is an axial section of a mixing valve example incorporating disks in ceramic or similar materials in accordance with the invention.
Figure 2:
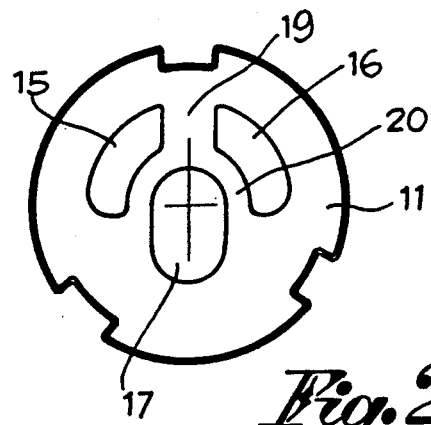
FIGS. 2 and 3 respectively show the lower and upper surface of the fixed disk.
Figure 13:
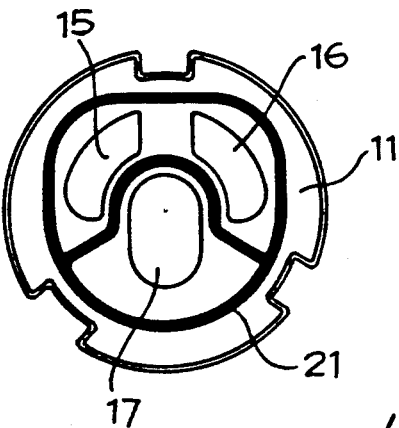
FIG. 13 is an underneath view of the fixed disk.
Figure 5:
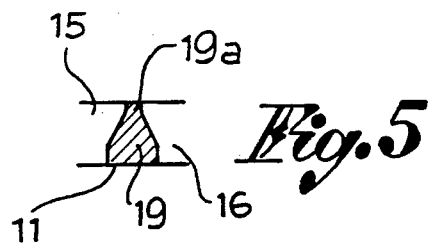
FIGS. 4 and 5 respectively are section views of the fixed disk on the lines IV—IV and V—V in FIG. 3.

The cartridge body (10) of the valve is indicated in FIG. 1 and encloses a lower fixed disk (11) which is sealed onto the bottom (10a) of the body, and a moving disk (12) which rests and is movable, both radially and in rotation, on the fixed disk (11). The upper movable disk (12) is operated, for example, by a control lever (13) indirectly joined to the same disk by a disk-cover (14) to which it is hooked.

The fixed disk (11) has two water inlet holes or openings (15,16) designed to join corresponding (not represented) cold and hot water conduits and an opening (17) to let out hot, cold or mixed water towards a tap. The movable disk (12) has in turn a mixing chamber (18) which is open on the side near to the fixed disk (11) and closed at the top by the disk cover (14). The mixing chamber, depending on the position of the movable disk on top of the fixed one, can close the water inlet holes or allow a part or the entire of one or both water inlet holes to communicate with the outlet hole (17) so as to control the outflow of hot, cold or mixed water.

According to the invention, the two water inlet holes or openings (15,16) of the fixed disk (11) substantially have a uniform width symmetrically about a water dividing partition (19) placed in a radial plane, into one half of the disk. The water inlet holes or openings (15,16) angularly extend from the water dividing partition (19) in opposite directions, both through a 90° arc and with parallel sides. The water partition (19) tapers off from the bottom towards the top to form a cusp (19a) which reduces the space between the two water inlet holes and forms the so-called comfort angle.

Figure 3:
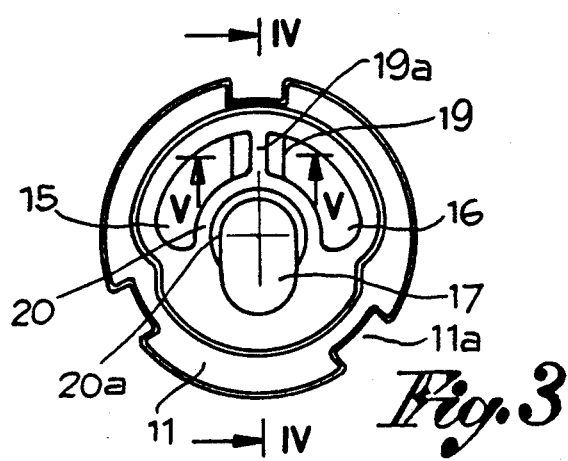
Figure 4:
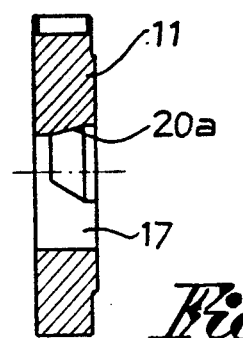
Figure 15:
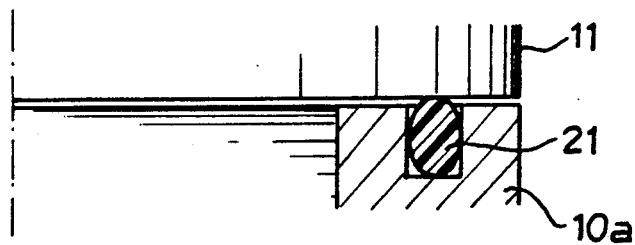
FIGS. 15, 16, 17, 18 are different section views of the gasket placed between the bottom of the body and the fixed disk.
Figure 16:
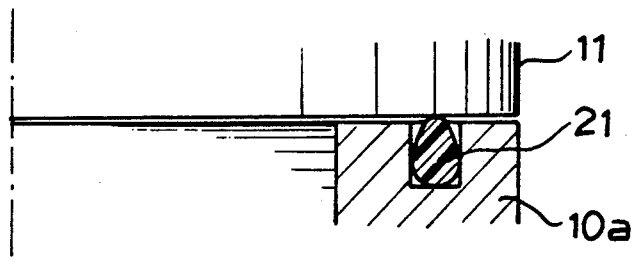
Figure 17:
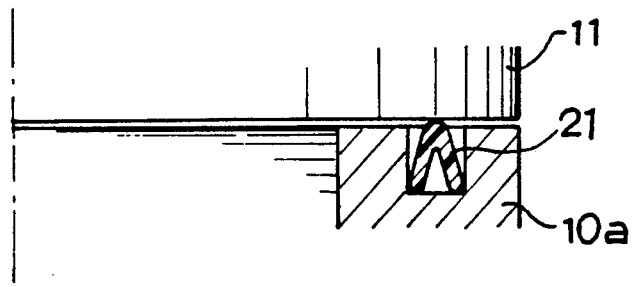
Figure 18:
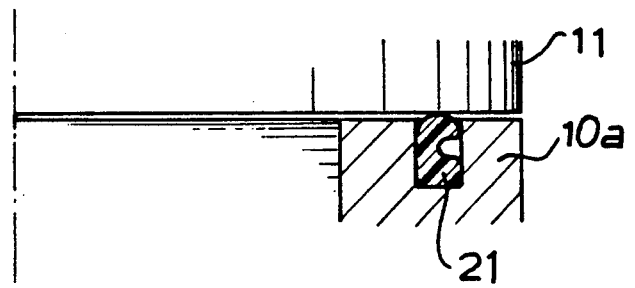

The water outlet hole or opening (17) of the fixed disk (11) has an elliptic shape (FIG. 3), with the centre line passing through the above mentioned water dividing cusp (19a) and with a focus coinciding with the centre of the disk (11) and the other focus in the half of the disk opposite into which the water inlet holes or openings (15,16) are cut. Part of the water outlet hole (17) is therefore placed between the two water inlet holes or openings (15,16) and is delimited by a partition (20). The remaining part of the outlet hole extends away from said openings but still in a centre line position. The partition (20) between the water outlet hole and the water inlet holes also tapers off towards the movable disk (12), with a bevel (20a) at least on the side of the water outlet hole.

A single shaped gasket is fitted on the lower surface of the fixed disk (11), passing round and enclosing all the holes and openings (15,16,17) isolating one from the other. This gasket (21) can correspond to one of the cutaway views illustrated in FIGS. 15 to 18 of the drawing.

The mixing chamber (18) in the movable disk (12) has a key-hole shape which is defined by a circular part (18a) which has a smaller radius than the minimum radius of the water inlet holes (15,16) and is off-centre to the geometrical centre of the disk, and a polygonal or rectangular part (18b). The opposite sides of said hole or opening widen towards the top, that is to say towards the disk-cover (14).

FIGS. 9 to 12 illustrate various interaction positions between the two overlapping disks, where the mixing chamber (18) with the water inlet and outlet holes (15,16,17), depends on the position of the movable disk (12) on top of the fixed one (11) so as to achieve the complete closure of the valve (FIG. 9); the flow of only hot water (FIG. 10); the flow of only cold water (FIG. 11); and the flow of mixed hot and cold water. For the positionings which allow the water to flow, the circular part (18a) of the mixing chamber (18) moves over the water inlet holes whereas the polygonal part (18b) remains over the water outlet hole (17).

For the correct positioning of the disks (11,12) inside the cartridge type body (10), the fixed disk (11) has some nonsymmetrical grooves (11a) designed to engage with said cartridge type body, whereas the movable disk (12) has some symmetrical grooves (12a) interagent with the disk cover (14).

A limit stop (10a) will be placed inside the catridge type body so as to control the direction of the disk-cover (14) and therefore the direction of the movable disk (12) for the valve closure position.

Some discharge outlets (22), (as shown in FIGS. 1 and 14) are cut into the bottom of the cartridge type body (10) between the feet (where present) which are connected to the hot and cold water conduits so as to permit the flow of the water and not create blockages which limit the flow capacity allowed by the disks (11,12).

While a specific embodiment of the invention has been shown and described in detail to illustrate the application of the principles of the invention, it will be understood that the invention may be embodied otherwise without departing from such principles.

I claim:
1. A water flow control unit comprising:
    a cartridge type body;
    a fixed disk mounted in said cartridge type body, said fixed disk defining two inlet openings and one outlet opening and a water dividing partition, said two inlet openings being of radial orientation and are substantially of uniform width and substantially symmetrical with respect to said water dividing partition, said outlet opening having an elliptical shape with one part placed between said two inlet openings and another part extending into a separate half of the disk;
    a movable disk defining a mixing chamber said mixing chamber having a circular part with a smaller radius than an inside radius of said inlet openings, said circular part positioned off center from a center of said movable disk, and said mixing chamber having a communicating polygonal part, said movable disk movably mounted on said fixed disk in said cartridge type body and connecting said inlet openings to said outlet openings via said mixing chamber.

2. A water flow control unit in accordance with claim 1, wherein:
    said inlet openings extend in opposite directions in substantially 90 degree arcs and said water dividing partition has a taper to form a cusp on a surface of said fixed disk, said cusp being in contact with said movable disk.

3. A water flow control unit in accordance with claim 2, wherein:
    said elliptic shaped outlet opening has a focus in a center of said fixed disk and another focus on said separate half where a center line of said elliptic shaped outlet opening passes through said water dividing partition.

4. A water flow control unit in accordance with claim 1, wherein:
    a partition separates said inlet openings from said outlet opening and said partition is tapered on a side of said inlet openings towards said movable disk.

5. A water flow control unit in accordance with claim 1, wherein:
    opposite sides of said mixing chamber widen away from said fixed disk and said movable disk is movable to position said circular part of said mixing chamber over said inlet openings.

6. A water flow control unit in accordance with claim 1, further comprising:
    a gasket fitted on said fixed disk on a side opposite said movable disk, said gasket enclosing said inlet and outlet openings and said gasket having one of an elliptic, water drop, C or V shape.

7. A water flow control unit in accordance with claim 1, further comprising:
    an operating lever connected to said movable disk for controlling movement of said movable disk.

8. A water flow control unit in accordance with claim 1, further comprising:
    a disk cover splined to said movable disk by non-symmetrical grooves;
    said fixed disk splined to said cartridge type body; and
    said cartridge type body defining discharge outlets so as to increase flow.

9. A flow control unit comprising:
    a cartridge body;
    a fixed disk mounted in said cartridge type body, said fixed disk defining two inlet openings and one outlet opening and a water dividing partition, said inlet openings shaped as substantially 90 degree arcs, extending in opposite directions, having a substantially uniform width and substantially symmetrical about said water dividing partition, said outlet opening having a shape of an ellipse and a focus of said ellipse being located in a center of said fixed disk, said ellipse extending away from said inlet openings along a longitudinal axis of said water dividing partition;
    a movable disk defining a mixing chamber having a circular part of said mixing chamber which communicates with a rectangular part, said circular part is located off center of said movable disk towards said inlet openings, and said circular part having a radius less than an inside radius of said inlet openings, said rectangular part extending out of said circular part towards said outlet opening, said movable disk movably mounted on said fixed disk in said cartridge type body for positioning said circular part with said inlet openings and said rectangular with said outlet opening.

10. A flow control unit in accordance with claim 9, wherein:
a transverse length of said rectangular part is less than a diameter of said circular part giving said mixing chamber a keyhole shape.

* * * * *